United States Patent [19]

Ginsburgh

[11] 4,331,117
[45] May 25, 1982

[54] SYSTEM AND METHOD FOR CONTROLLING ENGINE KNOCK

[75] Inventor: Irwin Ginsburgh, Morton Grove, Ill.

[73] Assignee: Standard Oil Company (Indiana), Chicago, Ill.

[21] Appl. No.: 105,777

[22] Filed: Dec. 20, 1979

[51] Int. Cl.³ .................... G01L 23/22; G01N 33/22; F02P 11/02; G06F 15/20
[52] U.S. Cl. .................................. 123/425; 123/483; 123/417; 73/35
[58] Field of Search .................... 73/35; 123/419, 417, 123/478, 483, 425, 435

[56] References Cited

U.S. PATENT DOCUMENTS

| | | | |
|---|---|---|---|
| 4,002,155 | 6/1977 | Harned et al. | 123/425 |
| 4,012,942 | 3/1977 | Harned | 123/425 |
| 4,058,709 | 11/1977 | Long | 123/483 |
| 4,111,035 | 9/1978 | West et al. | 73/35 |
| 4,116,173 | 9/1978 | McDougal et al. | 123/425 |
| 4,204,256 | 5/1980 | Klötzner | 123/417 |

*Primary Examiner*—Raymond A. Nelli
*Attorney, Agent, or Firm*—James R. Henes; William T. McClain; William H. Magidson

[57] ABSTRACT

A closed loop electronic system and method is disclosed for controlling the spark timing and knock condition in each cylinder separately of a spark ignition, multicylinder internal combustion engine.

22 Claims, 2 Drawing Figures

SYSTEM AND METHOD FOR CONTROLLING ENGINE KNOCK

BACKGROUND OF THE INVENTION

1. Field of the Invention

This invention relates generally to an electronic system and method for controlling ignition timing in an internal combustion engine and more particularly concerns a closed loop electronic system and method for controlling the spark timing and knock condition in each cylinder separately of a multicylinder internal combustion engine.

2. Description of the Prior Art

Under normal conditions, ignition timing in a particular cylinder is controlled by the distributor in a spark ignition internal combustion engine so that the spark occurs several degrees before the piston in the cylinder reaches its top dead center position or point of minimum combustion volume. This allows the ignition lag and the propagation of a flame front in the combustion chamber to complete the combustion of the compressed gas mixture of air and fuel so that the maximum pressure of combustion will occur so as to maximize economy and/or power within exhaust emission constraints.

The usual automatic spark control device connected with the timing mechanism is often so arranged that the spark is advanced to a considerable extent as the speed of the engine increases. In fact, in some makes of automobile engines, this advance in the spark in one cylinder could be as much as 50 or 60 degrees before the position of the piston in the cylinder reaches its top dead center position. This is necessary because, even though the speed of the engine increases, the rate of combustion and flame propagation within the engine is nearly constant and therefore does not correspondingly increase. Hence, in order to insure complete combustion at the right point, the spark must be automatically advanced. This advance of the spark often, in some types of engines and particularly when a low octane gasoline is used or there has been considerable carbon deposit, may produce knock or detonation.

Knock or detonation is the pressure oscillations of the gases in the combustion chamber in spark ignition engines caused by the self-ignition of the remaining air-fuel mixture in this chamber before this mixture can be burned completely by propagation of a flame front. If the degree of compression of the fuel charge at or immediately before ignition exceeds the ability of the fuel to burn completely by propagation of a flame front, an audible detonation or knock may occur. The audible knock is due to the transmission of vibrations through the rest of the engine and perhaps a resonance response in certain engine parts.

It is well known that knock or detonation in engine operation can usually be decreased by a knock control system which delays the ignition timing to a value at which the fuel will burn without detonation. This prevents complete combustion from taking place until after the piston has passed its top dead center position or the point of minimum combustion volume.

It must be recognized that it may be desirable to maintain the spark timing at the point of maximum advance consistent with operation of the engine with knock at an acceptably low level. Delays in spark ignition introduced by a knock control system detract from the power developed by the engine. Thus, engine performance may suffer when knock is eliminated by spark delay and it may be desirable to have a small amount of knock present in order to insure that engine performance and fuel economy are maintained at a high level. On the other hand, excessive knock is aesthetically objectionable and can damage an engine. Thus, it is desirable to control engine operation so that a certain amount of knock is allowed or even maintained but so that the knock is not permitted to become loud enough to be objectionable to the vehicle occupant or to cause engine damage.

Only a knock control system which entails automatic and continuous control of the knock condition during normal operation of an internal combustion engine permits maximization of the benefits of knock control. Keller et al., U.S. Pat. No. 3,822,583, which issued July 9, 1974, disclose one such system and method which employs closed loop electronics for automatically controlling the timing of the spark ignition and thereby the knock condition in an internal combustion engine during operation. The device disclosed includes means for detecting engine vibrations during an engine cycle resulting from engine knock and normal engine operation and for producing a composite signal which has an engine knock component and a normal engine performance component and which is proportional to the intensity of a portion of said engine vibrations having frequencies which include at least one frequency of said knock vibrations, the composite signal having an engine knock component and a normal engine operation component; means for generating a background signal which corresponds to the normal engine operation component of the composite signal; means for measuring the difference between the composite signal and the background signal to obtain the knock component of the composite signal and for generating a knock signal in direct relation to the knock component of the composite signal; and means for adjusting, if the knock signal is different from a predetermined level therefor, the spark ignition timing in all of the cylinders simultaneously and uniformly during at least one successive engine cycle, the adjustment being such as to reduce the difference between the knock signal and the predetermined level therefor. The entire disclosure of U.S. Pat. No. 3,822,583 is specifically incorporated herein by reference.

Subsequently, a closely related device and method were disclosed by J. H. Currie, D. S. Grossman and J. J. Gumbleton in two papers, one entitled "Knock Control for Energy Conservation" and presented at an ACS meeting on Conservation at Miami Beach in Sept., 1978, and a second entitled "Energy Conservation with Increased Compression Ratio and Electronic Knock Control" and presented in the SAE Technical Paper Series in Detroit on Feb. 26–Mar. 2, 1979, and by T. F. Wallace in a paper entitled "Buick's Turbocharged V-6 Powertrain for 1978" and presented in the SAE Technical Paper Series in Detroit on Feb. 27–Mar. 3, 1978.

However, it must be recognized that although the knock level in one cylinder may be objectionably loud, the knock level in the other cylinders may not be objectionably loud and, in fact, the knock level in one or more of these other cylinders may even be lower than the level desired to maximize engine performance and fuel economy. Under such conditions, it would result in a loss of vehicle performance and fuel economy if spark ignition were delayed in all of the cylinders merely to delay the ignition spark in the one cylinder having an objectionably loud knock. Thus, when an engine is knocking at an objectionable level, it is desirable to maximize vehicle performance and fuel economy by delaying the spark ignitions in only those cylinders where detonation is occurring at an objectionable level. Furthermore, even if several or all of the cylinders are knocking at an objectionable level, such cylinders may not be knocking to the same extent, and thus the spark ignitions in such cylinders should be delayed by different degrees in order to maximize engine performance and fuel economy. Moreover, it may be desirable to advance the spark ignition in each cylinder where the knock level is lower than that desired to maximize engine performance and fuel economy. The aforedescribed prior art closed loop electronic systems and methods do not permit such selective control of the timing of the spark ignitions in each cylinder separately.

OBJECTS OF THE INVENTION

It is therefore a general object of the present invention to provide a system and method for controlling the knock condition in a multicylinder internal combustion engine which overcomes the aforedescribed problems of prior art systems and methods.

More particularly, it is an object of the present invention to provide a system and a method for controlling the knock condition in each cylinder separately of a spark ignition multicylinder internal combustion engine.

Similarly, an object of the present invention is to provide a closed loop electronic system and a method for detecting the knock level in each cylinder of a multicylinder internal combustion engine, identifying the cylinders where the knock level deviates from a predetermined level and adjusting the spark ignition timing in only the cylinders where a deviation occurs to thereby maximize engine performance and fuel economy.

Other objects and advantages of the invention will become apparent upon reading the following detailed description and appended claims and upon reference to the accompanying drawings.

SUMMARY OF THE INVENTION

These objects are achieved by the present invention which is a closed loop electronic system and method for separately controlling the knock condition in each individual cylinder of a spark ignition multicylinder internal combustion engine. The system of the present invention includes means for detecting engine vibrations at a given time during an engine cycle and resulting from engine knock and from normal engine operation and for producing a composite signal which is proportional to the intensity of a portion of the engine vibrations having frequencies which include at least one knock vibration frequency and which has an engine knock component and a normal engine operation component; means for generating a background signal which corresponds to the normal engine operation component of the composite signal; means for measuring the difference between the composite signal and the background signal to obtain the knock component of the composite signal and for generating a knock signal in direct relation to the knock component of the composite signal; means for identifying the cylinder in which spark ignition last occurred before the vibrations were detected; and means for adjusting, if the knock signal is different from a predetermined level therefor, the spark ignition timing in the identified cylinder during at least one engine cycle following the aforesaid cycle, the adjustment being such as to reduce the difference between the knock signal and the predetermined level therefor.

The method of the present invention is made up of steps comprising the functions performed by the elements listed above of the system of this invention.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

It should be understood that the drawings are not necessarily to scale and that the embodiments are illustrated by graphic symbols and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

The present invention takes advantage of the fact that the spark plugs in the cylinders of an internal combustion engine ignite sequentially, not simultaneously, with the successive spark ignitions separated by a finite amount of time. Knock in any given cylinder occurs only after the spark in that cylinder ignites and before the next spark ignition in another cylinder. If knocks are occurring in more than one cylinder in a given engine cycle, a separate knock will be detected for each knocking cylinder. Thus, the knock detected within a sufficiently narrow time frame results from knock in only one cylinder.

Figure 1:
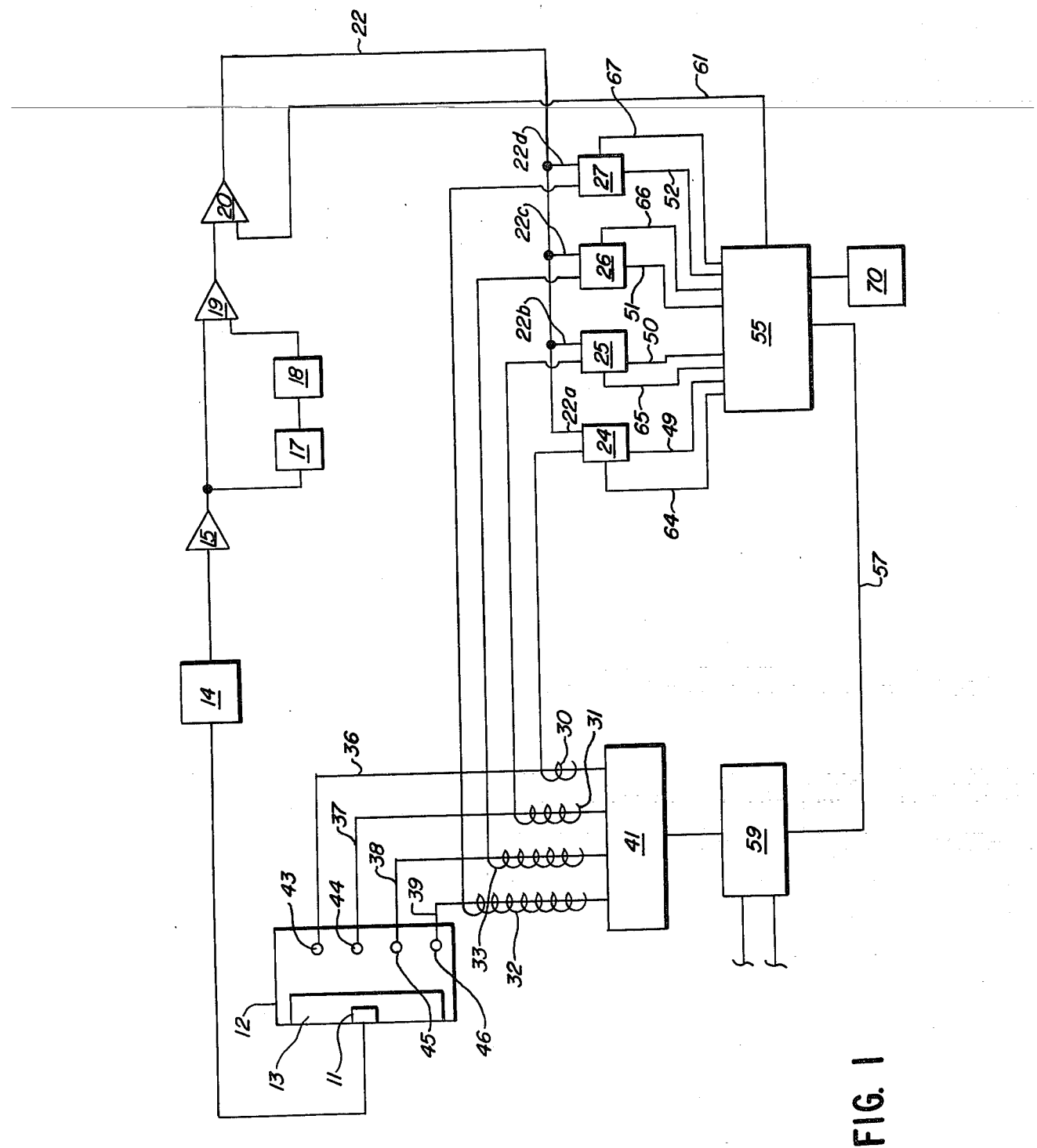
FIG. 1 is a schematic illustration of one embodiment of the system and method of the present invention in use in a four cylinder engine.

Turning now to FIG. 1, there is shown in schematic form an example of a suitable closed loop electronic system according to the present invention. The present invention includes any suitable device 11 for sensing the presence and intensity of engine vibrations and generating a signal proportional to the intensity of engine vibrations. A particularly suitable sensor 11 is a piezoelectric transducer, such as a General Radio high frequency Model 1560-P3 accelerometer. Typically only one such transducer suffices; however, a plurality of such transducers suitably spaced on the engine 12 and with added electronic outputs can be used.

Since in the present invention the knock condition of each cylinder is to be measured and controlled separately, it is usually very desirable to locate the sensor 11 in an area where the mass of the engine 12 provides equal vibration transmission paths so as not to amplify or reduce the input from any one cylinder relative to that from any other cylinder. In the alternative or in addition, it is possible to electronically compensate for any amplification or reduction of the input of any cylinder relative to the inputs from the other cylinders by means which will be illustrated hereinbelow. However, in certain instances, a particular cylinder may be separated from the vehicle occupants by a sound shield or by a sufficiently greater distance than the other cylinders, and a knock of a given intensity from such cylinder may not be as objectionable to the vehicle occupants as a knock of equal intensity from one of the other cylinders. In such case, it may not be desirable to compensate for any reduction of the input from such cylinder to the sensor 11 relative to the inputs from the other cylinders.

Placement of the sensor 11 is preferably on the exterior of the engine such as the intake manifold 13 of the engine 12 instead of being mounted inside a cylinder which either requires a boring operation or specially equipped spark plugs. Temperature resistant vibration transducers are particularly well adapted for use in the present invention because they can be mounted on the engine exterior, with no modifications to the engine 12 being required which might change the knock characteristics of the engine.

The sensor 11 detects all engine vibrations. Those caused by normal engine operation, such as cylinder firings, valve closings, push rod operations, etc., appear as background that occurs with or without knock. When in addition detonation occurs, the sensor 11 output increases over the background level. It is especially advantageous to use a sensor 11, for example, the General Radio high frequency Model 1560-P3 transducer, whose electrical output is proportional to the second derivative, not to the first derivative, with respect to time of the amplitude of the engine vibrations, and thereby to obtain an improved knock to background ratio.

The output signal from the sensor 11 is processed by any suitable means so as to remove therefrom substantially all components of the signal having frequencies outside a preselected band of frequencies which includes at least one frequency of the knock vibrations measured. For example, at the present time it is particularly convenient to employ for measurement purposes knock vibrations having frequencies ranging between 4 and 10 kilohertz for typical automotive engines. As illustrated in FIG. 1, a band pass filter 14 is suitable for this purpose. In the alternative, the sensor 11 could be a tuned transducer which detects the engine vibrations but generates a signal in response to, and in proportion to the intensity of, only those vibrations having frequencies within a preselected band thereof which includes at least one knock vibration frequency.

In either case, the resulting signal coming from the filter 14 or directly from a tuned sensor is a composite which has an engine knock component (if engine knock is present) and a normal engine operation component and which is proportional to the intensity of those engine vibrations having frequencies within the preselected band of frequencies and from only the cylinder in which the spark ignition gave rise to the engine vibrations detected at that time. Thus the composite signal is proportional to the intensity of both knock and normal engine operation vibrations in that cylinder if engine knock is present, or to the intensity of normal engine operation vibrations alone if engine knock is not present.

When the output of the sensor 11 is of sufficient amplitude for performing the subsequent operations to be described below, no amplification is necessary. Otherwise any convenient audio amplifier 15 can be used to amplify the sensor's output coming from the filter 14 or from a tuned sensor. In any event, a signal which is proportional at least in part to knock intensity and which is of sufficient magnitude for performing the subsequent operations is provided.

A signal corresponding to the normal engine operation component of the composite signal is then generated. Any suitable means can be employed to quantify the normal engine operation component of the composite signal and to generate a background signal corresponding to this normal engine operation component. The background signal and the composite signal are then compared, and a difference signal corresponding to the knock component of the composite signal is generated.

Suitable electronic logic to perform these operations is illustrated in FIG. 1. The composite signal from the amplifier 15 is split, and one part thereof is continuously averaged to establish the normal engine operation component of the composite signal, as by the integrator 17 in FIG. 1 which provides a background signal proportional to the time integrated normal engine operation component of the composite signal, which is then amplified in amplifier 18. Since knock generally occurs during acceleration and since normal engine operation vibrations increase during acceleration, the background signal generally increases substantially linearly with engine speed. The output from the amplifier 18 and the other portion of the output of the amplifier 15 are fed to the inputs of an electronic comparator 19 which generates a knock signal in direct relation to the difference between the composite signal and background signal and hence in direct relation to the knock component of the composite signal.

The knock signal varies in direct relation with the knock component of the composite signal. For example, the amplitude, duration or energy content of the knock signal could be proportional to this knock component. Moreover, the knock signal could be a series of pulses whose number is proportional to this knock component. There need not, of course, be a strict proportionality between the knock signal and the knock component.

An adjustment in the spark timing can then be triggered in response to and in direct relation to the knock signal. However, as indicated above, it may be desirable to have a small amount of knock present. Thus it may be preferred that the knock signal be at some finite predetermined level. This predetermined level is set to correspond preferably to some unobjectionable knock level and more preferably to the highest unobjectionable knock level. The magnitude of the knock signal is compared to the predetermined level therefor, and an adjustment in the spark timing is triggered in response to and in direct relation to the difference.

When it is desired to maintain the engine knock at a predetermined level, a delay or advance from the normal ignition timing is triggered when the magnitude of the knock signal exceeds or is less than, respectively, its predetermined level. In this instance, normal ignition timing is set by the relationship of the ignition pickup or sensor to the crank shaft, engine speed advance and manifold vacuum advance, as well as by a standard delay which varies with engine speed and which can be decreased to thereby generate in effect the desired degree of advance when the magnitude of the knock signal is less than its predetermined value. However, when it is desired only to maintain the engine knock below a predetermined level, only a delay from the normal ignition timing is triggered and only when the knock signal exceeds its predetermined level. In this instance, normal ignition timing is set only by the relationship of the ignition pickup or sensor to the crank shaft, engine speed advance and manifold vacuum advance.

FIG. 1 illustrates one suitable means for comparing the knock signal with a predetermined value therefor. The knock signal is fed to one input of a second comparator 20. To the other input of the comparator 20 is fed a reference signal which simulates the knock signal but has a predetermined value that varies with engine speed. Suitable means for generating the reference signal will be discussed hereinafter. The comparator 20 generates a signal corresponding to the difference between the magnitude of the knock signal and its predetermined level. A delay or advance in ignition timing is then triggered in response to and in direct relation to this difference signal. When there is no difference between the knock signal and its predetermined value, a difference signal is not generated, a delay or advance in ignition timing is not triggered, and the normal ignition timing remains in effect. When the predetermined level is set at zero, the difference signal and the knock signal are identical, and the delay or advance is triggered in effect by the knock signal. In such case, the comparator 20 could be omitted if desired.

Electronic logic is then provided to determine in which cylinder knock has occurred to generate the particular knock signal and/or difference signal and thus for which cylinder the ignition timing should be adjusted. Knock would occur in a particular cylinder only after the spark in that cylinder ignited and before the next spark in another cylinder ignites. At a given engine speed, the time lapse between spark ignition in one cylinder and knock in the same cycle and in the same cylinder is shorter than the time lapse between spark ignition in one cylinder and a subsequent knock in any other cylinder in the same or a different cycle. Thus, a determination of sequential coincidence between spark ignition in any one cylinder and the particular knock signal subsequent thereto, within a time gate sufficient to encompass the shorter time lapse but not the longer time lapse would serve to identify that cylinder from which a particular knock signal arose.

Suitable electronic logic to perform the coincidence measurement is illustrated in FIG. 1. The output from the comparator 20 is transmitted by the line 22 and is split in the lines 22a, 22b, 22c and 22d into as many parts as cylinders in the engine. Each of these parts is then fed to one input of the separate conventional coincidence gates 24, 25, 26 and 27. To the other inputs to the coincidence gates are fed signals which are generated by electrical pulses related to the spark discharges in each cylinder and induced and carried in the induction pickups 30, 31, 32 and 33, respectively, around the spark plug wires 36, 37, 38 and 39, respectively, each carrying an electric pulse from the distributor 41 to the respective spark plug 43, 44, 45 or 46.

When no difference signal is generated at all or when a particular difference signal is not coincident within the predetermined time frame with a preceding spark ignition in one of the cylinders, the normal ignition timing is passed directly to the spark plug in such cylinder. However, when a particular difference signal and a preceding spark ignition in one cylinder are coincident within the predetermined time frame, the reference signal is transmitted through the respective coincidence gate 24, 25, 26 or 27 and the respective line 49, 50, 51 or 52 for that cylinder to the circuitry 55 which in turn is activated thereby and generates a delay or advance in the basic timing of at least one of the next successive spark ignitions in only that cylinder where the spark ignition is sequentially coincident with the difference signal.

The signal from the circuitry 55 can be used to produce a delayed or advanced spark ignition in any convenient manner. For example, as illustrated in line 57 to the pulser and thereby trigger a delay or advance in only the electrical ignition pulse from the pulser 59 to the distributor 41 which is transmitted to the spark plug 43, 44, 45 or 46 in the cylinder in which spark ignition is sequentially coincident with the particular subsequent knock signal within the predetermined time frame.

The circuitry 55 is most conveniently a microprocessor which is commercially available and can be programmed using conventional computer logic to perform all of the functions described hereinbelow. The microprocessor 55 receives the difference signal from the comparator 20 transmitted through the coincidence gate 24, 25, 26 or 27 and the line 49, 50, 51 or 52, respectively, and, in response thereto, generates a delay or advance in the ignition timing of the spark plug 43, 44, 45 or 46, respectively.

The microprocessor 55 is able to distinguish a first difference signal due to a knock signal in excess of the predetermined level therefor from a second difference signal due instead to a knock signal less than the predetermined level therefor and thus is able to generate a delay in ignition timing in response to the first difference signal and to generate an advance in ignition timing in response to the second difference signal.

The microprocessor 55 can also be designed to introduce a standard delay into the normal ignition timing which is dependent on the engine speed but independent of the knock condition, in order to effect a normal ignition timing which is delayed relative to spark timing determined only by basic timing, centrifugal advance and vacuum advance. In this manner, a normal delayed timing is produced which can then be advanced in response to a difference signal resulting when the knock signal is less than the predetermined level therefor.

While a delay introduced in the spark ignition timing can be fixed for a given engine speed regardless of the magnitude of the difference signal, it is preferred that the microprocessor 55 introduce a delay which varies in direct relation to the difference signal and which is only of sufficient magnitude to reduce the knock level to a predetermined unobjectionable level and thereby to reduce the engine's operating performance and fuel economy only to the extent necessary to reduce knock to a commercially acceptable level. Similarly an advance introduced in the spark ignition timing can be fixed for a given engine speed regardless of the magnitude of the difference signal, but preferably the advance introduced varies in direct relation to the difference signal. While it is possible for this delay or advance to be as large as 50 degrees, a delay or advance of 11 degrees or less is more typical.

The maximum spark retard or advance available using the system and method of this invention is determined by the physical characteristics of the ignition system and vehicle drivability. The final vehicle spark calibration with a knock control system of this invention must, therefore, be evaluated under the most severe deviations from the predetermined knock level, to ensure that the system has sufficient delay or advance capacity to control knock while maintaining drivability.

Further, in recognition that the amount of delay or advance in ignition timing in real time corresponding to an amount of delay or advance in ignition timing in degrees varies with engine speed, the microprocessor 55 stores the required number of degrees of delay or advance in ignition timing for each speed, measures engine speed in revolutions per minute (for example, by averaging the time interval between successive spark signals), calculates the delay or advance necessary in real time corresponding to the number of degrees of delay or advance required at the engine speed and introduces the delay or advance in the pulse from the pulser 59 to the distributor 41 at the correct instant to delay or advance ignition timing in the proper cylinder.

Having initiated a delay or advance in the ignition timing in a particular cylinder in one cycle, the microprocessor 55 is capable of introducing a delay or advance, respectively, in the pulse to the distributor 41 at the correct instant to delay or advance, respectively, the spark timing of the same cylinder in a number of the next successive cycles, gradually decreasing the delay or advance, respectively, introduced during the previous cycles. Thus, in the present invention the microprocessor 55 retards or advances spark ignition timing rapidly to control knock and then generally can reduce the number of degrees of delay or advance gradually over a number of the next successive engine cycles to normal ignition timing. This slow return to normal ignition timing is a feature used to maintain smooth vehicle operation during knock control. More rapid changes in the return to normal spark timing can cause uneven engine power resulting in vehicle surge which is observed by the driver as a jerky motion of the vehicle. The return to normal ignition timing might require as long as 25 seconds. The length of time required for the return to normal timing can be fixed regardless of the magnitude of the delay or advance but preferably varies in relation to the magnitude of the delay or advance.

The microprocessor 55 also generates the reference knock signal of predetermined level and transmits it via line 61 to the second input to the comparator 20 where the knock signal and reference signals are compared and the difference signal is generated. The predetermined level can of course be independent of engine speed but preferably varies as a function of engine speed. Thus, as illustrated in FIG. 1, the microprocessor receives the output of the engine speed sensor 70 and varies the level of the reference signal in direct relation thereto. The reference signal could also be varied to take advantage of acoustic masking provided by a car radio: the louder the radio the higher is the level of the reference signal. Radio loudness could be sensed by a small microphone near the radio speaker or by a current sensor in the wires to the speaker.

As the engine speed increases, the time interval between successive spark ignitions decreases. Thus, the maximum permissible predetermined time frame within which sequential coincidence between spark ignition in one cylinder and a subsequent knock in that same cylinder in the same engine cycle decreases as engine speed increases. If set to be sufficiently narrow, for example, less than about 10 to 15 milliseconds for a four cylinder engine, the predetermined time frame can be constant regardless of engine speed. However, the microprocessor 55 can also utilize the output of the engine speed sensor 70 to generate controlling signals transmitted to the coincidence gates 24, 25, 26 and 27 through the lines 64, 65, 66 and 67, respectively, to decrease the width of the coincidence gates as the engine speed increases.

Compression for any amplification or reduction of the signal from any cylinder relative to the signal from any other cylinder due to unequal engine vibration transmission paths can easily be introduced by the microprocessor 55 so that the same delay or advance is generated for a particular knock vibration intensity, regardless of the identity of the cylinder from which that particular knock vibration originates.

The microprocessor 55 can of course generate a delay or advance in the ignition timing of a spark in a particular cylinder in response to a difference signal due to a detonation in that cylinder during a single engine cycle. In such case, the magnitude of the delay or advance is in direct relation to the single difference signal. Since under ordinary conditions, the magnitude of successive knock signals, and hence of successive difference signals, from the same cylinder may vary substantially during successive engine cycles, it is preferable for the microprocessor 55 to average a number of successive difference signals from a particular cylinder over a number of successive engine cycles and to generate a delay or advance whose magnitude is in direct relation to the time-averaged difference signal. In this manner, oscillations in knock control can be minimized.

Figure 2:
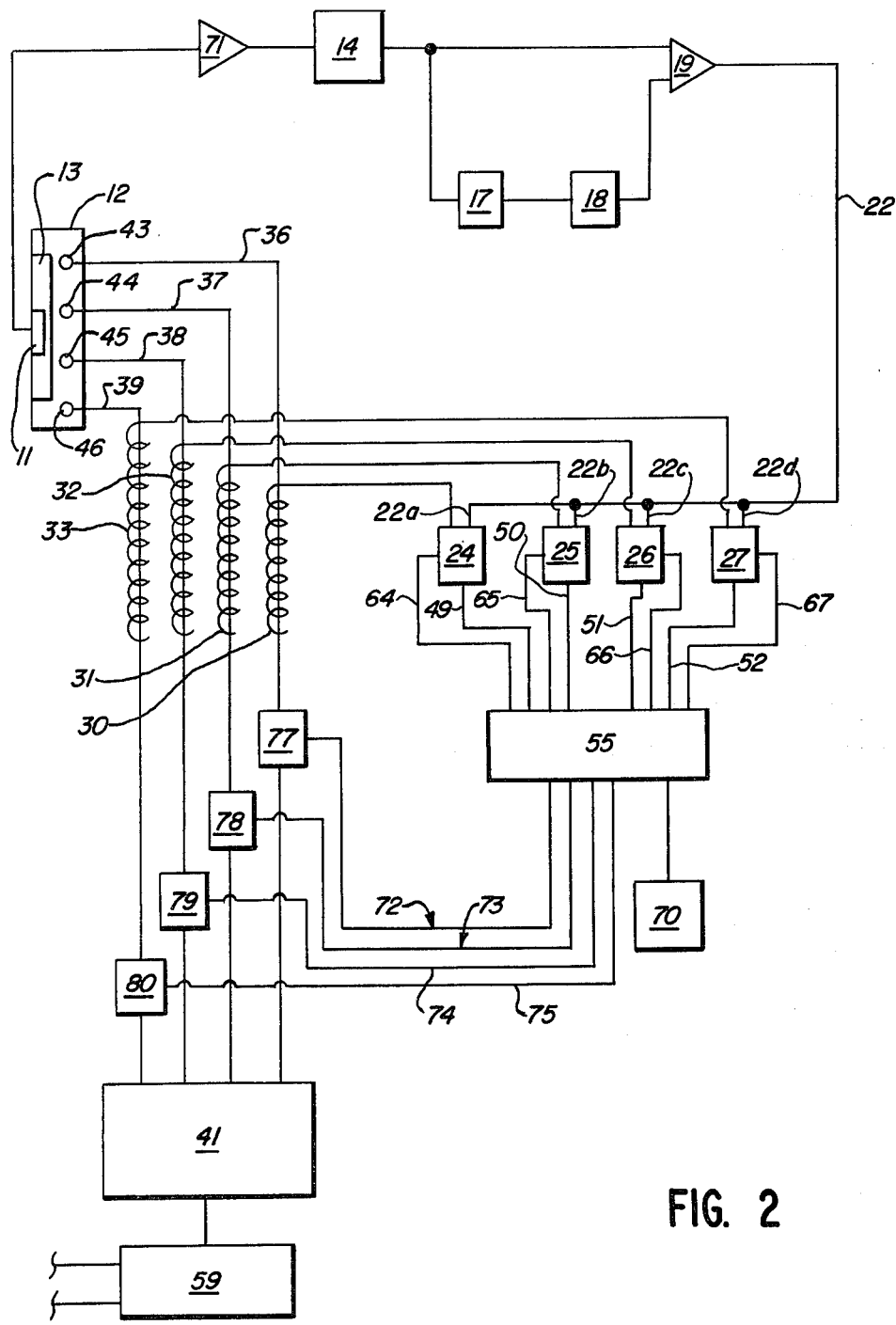
FIG. 2 is a schematic illustration of a second embodiment of this invention in use in a four cylinder engine.

Another embodiment of the system and method of this invention is illustrated in FIG. 2 where all elements corresponding to elements of FIG. 1 are numbered the same and are not described further. In the embodiment of FIG. 2, an amplifier 71 is used instead of the amplifier 15 in FIG. 1 and serves to amplify the signal from the sensor 11 before it is acted upon by the band pass filter 14. The comparator 20 of the embodiment of FIG. 1 is eliminated and the knock signal itself is transmitted via the coincidence gate 24, 25, 26 or 27 to the microprocessor 55. In this case, the comparison between the knock signal and a predetermined level therefor is made by the microprocessor which then triggers the proper delay or advance generator 77, 78, 79 or 80 which in turn generates a delay or advance in the electrical ignition pulse transmitted from the distributor 41 to the spark plug 43, 44, 45 or 46, respectively, in the cylinder in which spark ignition is sequentially coincident with the knock signal within the predetermined time frame.

This process is repeated for the vibrations detected and emanating from the other cylinders. Thus, using the system and method of the present invention, it is now possible to selectively control the spark ignition timing and knock condition in each cylinder separately.

It should, of course, be recognized that the sequential coincidence determination could be made at a variety of other stages in the system. For example, the coincidence gates could be located after the amplifier 15, to determine coincidence between spark ignition in one cylinder and the particular subsequent composite signal from the amplifier 15 before it is split. In addition, the microprocessor 55 could be programmed to perform the requested coincidence measurement.

From the above description it is apparent that the objects of the present invention have been achieved. While only certain embodiments have been set forth, alternative embodiments and various modifications will be apparent from the above description to those skilled in the art. For example, an alternative means for quantifying the normal engine operation component in the composite signal has been disclosed as means responsive to engine speed for generating a reference signal which simulates background audible noise, in Harned, U.S. Pat. No. 4,012,942, which issued Mar. 22, 1977, and which patent in its entirety is specifically incorporated herein by reference. In addition, although the invention has been illustrated in FIGS. 1 and 2 on a four cylinder engine, the invention is obviously useful with any multi-cylinder spark ignition internal combustion engine. These and other alternatives are considered equivalents and within the spirit and scope of the present invention.

Throughout this specification and the following claims, "engine cycle" is that time in the engine's operation during which every cylinder ignites once. It must be recognized that, throughout the following claims, the predetermined level for the knock signal could be set at zero and could be set at different levels for different cylinders.

Having described the invention, what is claimed is:

1. A closed loop electronic system for separately controlling the knock condition in an individual cylinder of a spark ignition multicylinder internal combustion engine automatically and continuously during normal engine operation, comprising:
   means for detecting during an engine cycle engine vibrations resulting from engine knock and from normal engine operation and for producing a composite signal which is proportional to the intensity of a portion of said detected engine vibrations having frequencies which include at least one frequency of said knock vibrations, said composite signal having an engine knock component and a normal engine operation component;
   means for generating a background signal which corresponds to said normal engine operation component of said composite signal;
   means for measuring the difference between said composite signal and its corresponding said background signal to obtain said knock component of said composite signal and for generating a knock signal in direct relation to said knock component of said composite signal;
   means for generating a reference knock signal of a predetermined level and separate and apart from said background signal;
   means for measuring the difference between said knock signal and said reference knock signal;
   means for identifying the cylinder in which spark ignition last occurred before said vibrations were detected; and
   means for adjusting, if said knock signal is different from said reference knock signal, the spark ignition timing in said identified cylinder during at least one engine cycle following said cycle, the adjustment being such as to reduce the difference between said knock signal and said reference knock signal;
   each such means performing its function automatically and continuously during normal engine operation.

2. The system of claim 1 wherein a delay in the spark ignition timing is generated when said knock signal is greater than said reference knock signal and wherein an advance in the spark ignition timing is generated when said knock signal is less than said reference knock signal.

3. The system of claim 2 wherein the magnitude of the delay or advance is in direct relation to the difference between said knock signal and said reference knock signal.

4. The system of claim 1 wherein only a delay in the spark ignition timing is generated and only when said knock signal is greater than said reference knock signal.

5. The system of claim 4 wherein the magnitude of the delay is in direct relation to the difference between said knock signal and said reference knock signal.

6. The system of claim 1 including means for generating a difference signal in direct relation to the difference between said knock signal and said reference knock signal and for adjusting the spark ignition timing of said identified cylinder in response to said difference signal.

7. A closed loop electronic system for separately controlling the knock condition in an individual cylinder of a spark ignition multicylinder internal combustion engine automatically and continuously during normal engine operation, comprising:
   means for detecting during each of a plurality of successive engine cycles engine vibrations resulting from engine knock and from normal engine operation and for producing a composite signal which is proportional to the intensity of a portion of said engine vibrations each of said plurality of engine cycles and having frequencies which include at least one frequency of said knock vibrations, said composite signal having an engine knock component and a normal engine operation component;
   means for generating for each of said plurality of engine cycles a background signal which corresponds to said normal engine operation component of said composite signal and represents the normal engine operation component of said detected engine vibrations;
   means for measuring the difference between said composite signal and its corresponding said background signal, to obtain said knock component of said composite signal and for generating a knock signal in direct relation to said knock component of said composite signal and representing the knock component of said detected engine vibrations;
   means for identifying the cylinder in which spark ignition last occurred before said vibrations were detected;
   means for obtaining from the knock signals for said identified cylinder at a given time during each of said plurality of engine cycles an average knock signal;
   means for generating a reference knock signal of a predetermined level and separate and apart from said background signal;
   means for measuring the difference between said average knock signal and said reference knock signal; and
   means for adjusting, if said average knock signal is different from said reference knock signal, the spark ignition timing in said identified cylinder during at least one engine cycle following said plurality of cycles, the adjustment being such as to reduce the difference between said average knock signal and said reference knock signal;
   each such means performing its function automatically and continuously during normal engine operation.

8. The system of claim 7 wherein a delay in the spark ignition timing is generated when said average knock signal is greater than said reference knock signal and wherein an advance in the spark ignition timing is generated when said average knock signal is less than said reference knock signal.

9. The system of claim 8 wherein the magnitude of the delay or advance is in direct relation to the difference between said average knock signal and said reference knock signal.

10. The system of claim 7 wherein only a delay in the spark ignition timing is generated and only when said average knock signal is greater than said reference knock signal.

11. The system of claim 10 wherein the magnitude of the delay is in direct relation to the difference between said average knock signal and said reference knock signal.

12. The process of claim 7 including means for generating a difference signal in direct relation to the difference between said average knock signal and said reference knock signal and for adjusting the spark ignition timing of the identified cylinder in response to said difference signal.

13. The system of claims 1 and 7 wherein said detecting and producing means comprises means for generating a combination signal which is proportional to the intensity of said detected engine vibrations and means for passing, as said composite signal, a portion of said combination signal which is proportional to the intensity of said portion of engine vibrations.

14. The system of claim 13 wherein said means for producing said composite signal includes means for amplifying said combination signal and said passing means passes said portion of the amplified combination signal as said composite signal.

15. The system of claims 1 and 7 wherein means are included for amplifying said composite signal for said cycle.

16. The system of claims 1 and 7 wherein said means for generating a background signal includes means for quantifying said normal engine operation component of said composite signal.

17. The system of claim 16 wherein said quantifying means includes means for separating out from said composite signal said background signal.

18. The system of claims 1 and 7 wherein said identifying means includes means for sensing spark ignition in each cylinder separately.

19. The system of claim 18 wherein said identifying means includes means for determining sequential coincidence within a predetermined time frame between said knock signal and the spark ignitions preceding said knock signal.

20. The system of claims 1 and 7 including means for compensating any amplification or reduction of the intensity of knock vibrations for any cylinder relative to the intensity of knock vibrations for any other cylinder.

21. The system of claims 2 and 8 wherein the magnitude of the delay or advance is predetermined.

22. The system of claims 4 and 10 wherein the magnitude of the delay is predetermined.

* * * * *